(12) United States Patent
Green, Jr. et al.

(10) Patent No.: US 6,201,372 B1
(45) Date of Patent: Mar. 13, 2001

(54) RESERVE POWER OPTION FOR A PORTABLE ELECTRONIC DEVICE

(75) Inventors: Donald R. Green, Jr., San Marcos; Scott Papineau, Escondido, both of CA (US)

(73) Assignee: Denso Corporation, Ltd., Aichi-Ken (JP)

( * ) Notice: Subject to any disclaimer, the term of this patent is extended or adjusted under 35 U.S.C. 154(b) by 0 days.

(21) Appl. No.: 09/392,353

(22) Filed: Sep. 8, 1999

(51) Int. Cl.[7] ........................................................ H02J 7/00
(52) U.S. Cl. ............................................. 320/132; 320/106
(58) Field of Search ...................................... 320/106, 132

(56) References Cited

U.S. PATENT DOCUMENTS

| | | | |
|---|---|---|---|
| 5,465,039 | * 11/1995 | Narita et al. | 320/164 |
| 5,548,763 | * 8/1996 | Combs et al. | 713/323 |
| 5,955,869 | * 9/1999 | Rathmann | 320/132 |
| 6,005,367 | * 7/1998 | Rohde | 320/106 |
| 6,008,620 | * 11/1998 | Nagano et al. | 320/106 |
| 6,025,695 | * 2/2000 | Friel et al. | 320/106 |

* cited by examiner

*Primary Examiner*—Peter S. Wong
*Assistant Examiner*—Pia Tibbits
(74) *Attorney, Agent, or Firm*—Fish & Richardson P.C.

(57) ABSTRACT

A portable electronic device has at least one battery pack with each pack having its own capacity gauge. A reserve power option system monitors power level information received from the capacity gauge to determine if the portable electronic device should be transitioned into a power-saving, low-current mode.

17 Claims, 6 Drawing Sheets

RESERVE POWER OPTION FOR A PORTABLE ELECTRONIC DEVICE

BACKGROUND

The present specification generally relates to a portable electronic device, and particularly to a power system for the device.

A wireless phone is often placed in a standby mode when the phone is not in use. The phone receives calls or monitors status information. However, if the phone is left in the standby mode, it can continue to drain battery power until it loses virtually all of its power. This can render the battery pack, and hence the phone, unusable.

A battery capacity gauge determines the amount of remaining usable battery power. This is analogous to an automobile "gas gauge". This gauge is connected to the battery pack. It can measure the current flowing in and out of the battery, the output voltage, and the temperature. The gauge can digitally integrate both charge and discharge current and voltage to calculate a state of charge of the battery pack. The data output from the gauge is displayed by a group of LEDs or uploaded to a host computer via an electronic data link. The data transmitted to the host computer may include data such as: remaining charge, total measured capacity, output voltage, real-time current, temperature, and error codes.

SUMMARY

A reserve power option system described herein recognizes that a portable electronic device can lose its battery power in a standby mode. Thereafter, the device is unusable during emergency or other situations. The current system allows the user to set a specified reserve battery power level. The user can enter different units for the power level, e.g. directly, or in terms of talk time minutes.

The portable electronic device has at least one battery pack, with each pack having its own capacity gauge. The reserve power option system monitors power level information received from the capacity gauge to determine if the portable device should be transitioned into a power-saving, low-current mode.

BRIEF DESCRIPTION OF THE DRAWINGS

These and other aspects will be described in reference to the accompanying drawings wherein.

DETAILED DESCRIPTION

A detailed description of a reserve power option system is herein provided with respect to the figures.

Figure 1:
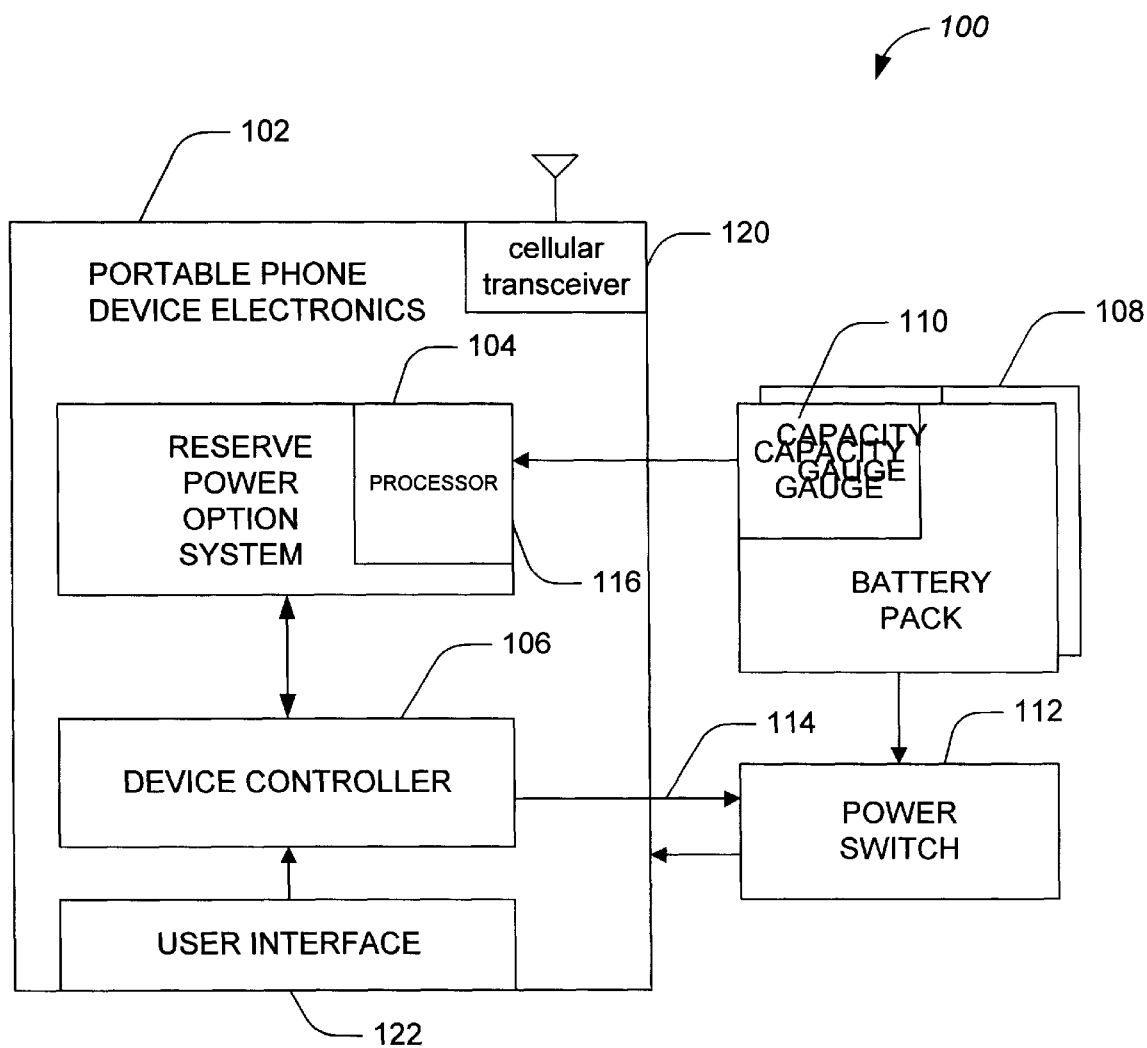
FIG. 1 is a block diagram of a portable electronic device.

FIG. 1 is a block diagram of a portable electronic device 100. The portable device 100 includes device electronics 102, at least one battery pack 108 and a switch 112. The reserve power option system 104, along with a device controller 106, is included in the device electronics 102.

The battery pack 108 supplies power to the portable device electronics 102 through a power switch 112 which is controlled by the device controller 106. The device controller 106 turns the power switch 112 on or off depending on a signal 114 generated by the reserve power option system 104. The electronics also include a cellular transceiver 120, and a user interface 122.

A processor 116 in the reserve power option system 104 monitors a battery capacity gauge 110 to determine if the battery power has reached a user-specified level. If the battery power has reached the user-specified level, the processor 116 transitions the portable device 100 from a standby mode to a low-current mode to reserve the remaining power for emergency or other use. The system 104 also generates a command to the device controller 106 to produce signal 114 to turn the power switch 112 off.

The user enters some value related to the particular power level, or some percentage of a total power, via user interface 122. The portable device 100 is transitioned into the low-current mode upon reaching that level. An alternative embodiment allows the user to enter a desired reserve talk time in terms of minutes. In this embodiment, the processor 116 computes an equivalent power level to transition the device into the low-current mode.

Figure 2:
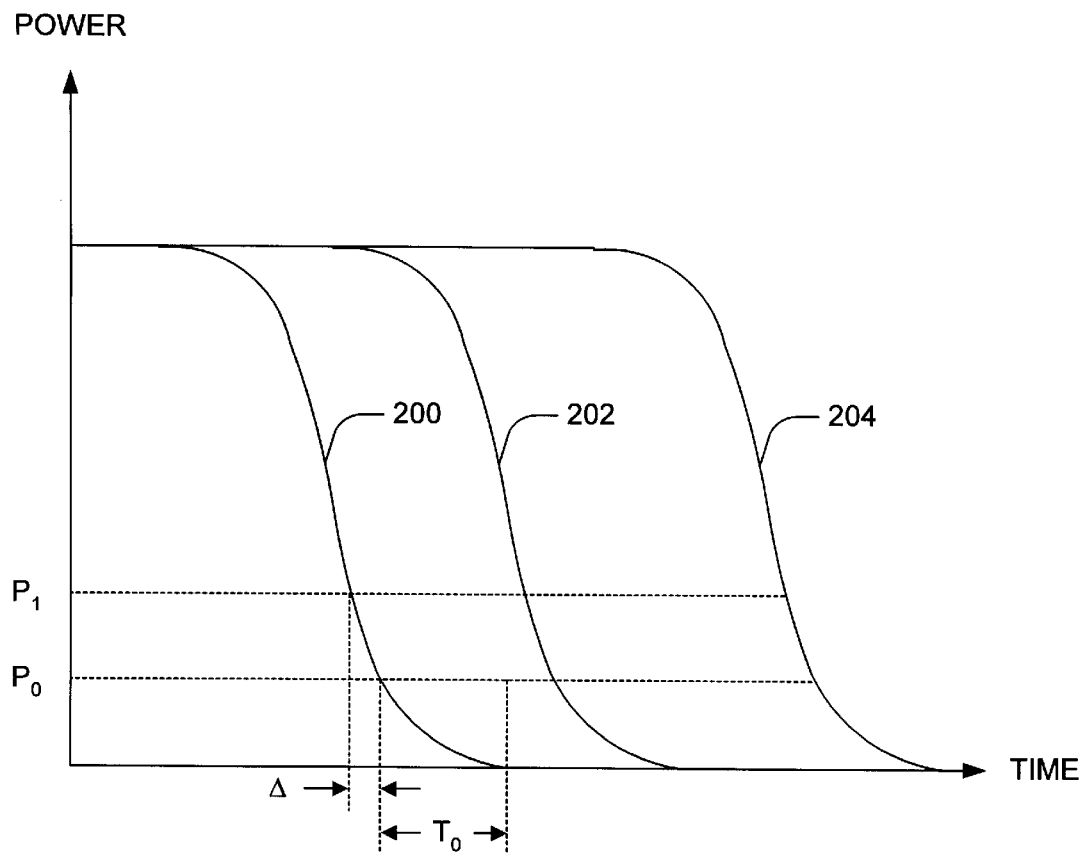
FIG. 2 illustrates a battery power dissipation profile.

An exemplary battery power dissipation profile is illustrated in FIG. 2 for three different types of batteries 200, 202, 204. The figure shows curves of battery power dissipation versus time. The battery capacity gauge 110 indicates the power level when this power level reaches $P_1$, for a battery type represented by a power dissipation profile 200, the reserve power option system 104 provides a warning to the user. After this warning, ($\Delta$) the power level reaches $P_0$. At that time, the reserve power option system 104 transitions the portable device 100 into the low-current mode without any further warning. The portable device 100, however, still has $T_0$ talk time minutes left for emergency or other use.

Different battery types 202, 204 have different power curves and hence different power levels for the same $T_0$ and $\Delta$. The power curve appropriate to the installed battery is used.

Figure 3:
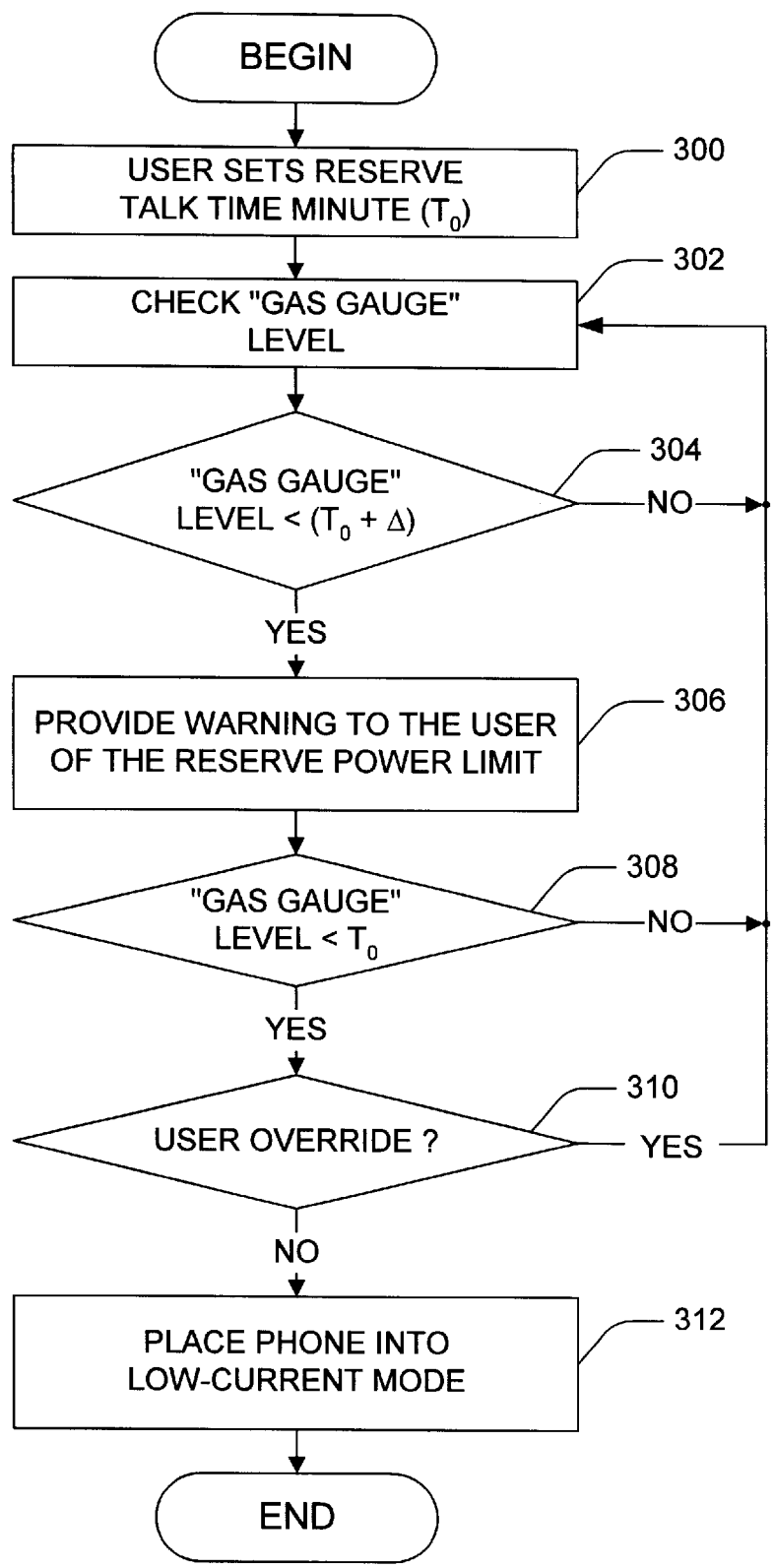
FIG. 3 is a flow diagram of a reserve power option system.

FIG. 3 is a flow diagram of the routine that is executed by the reserve power option system 104. The system 104 initially monitors input from the user to enter the reserve talk time minutes mode at step 300. Once the user sets the reserve talk time minutes mode, the system 104 checks the "gas gauge" level indicated by the battery capacity gauge 110, at step 302. If the "gas gauge" indicates a level corresponding to a user specified talk time minutes ($T_0$) plus some delta time (step 304), the system 104 provides warning to the user through a video display, an audio tone, a discrete indicator, or some combination of the three. This indicates that the portable device 100 will be transitioned shortly into a low-current mode (step 306).

The reserve power option system 104 then monitors the "gas gaugel" level for $T_0$ at step 308. If the level falls below $T_0$, the system 104 checks to see if the user override is present, at step 310. The user override indication is asserted when the user has decided to override the reserve power option. The entry can be made through a push-button or a keypad on the user interface 122. If the user override indication is not present, the device 100 is placed into a low-current mode at step 312.

Figures 4A, 4B:
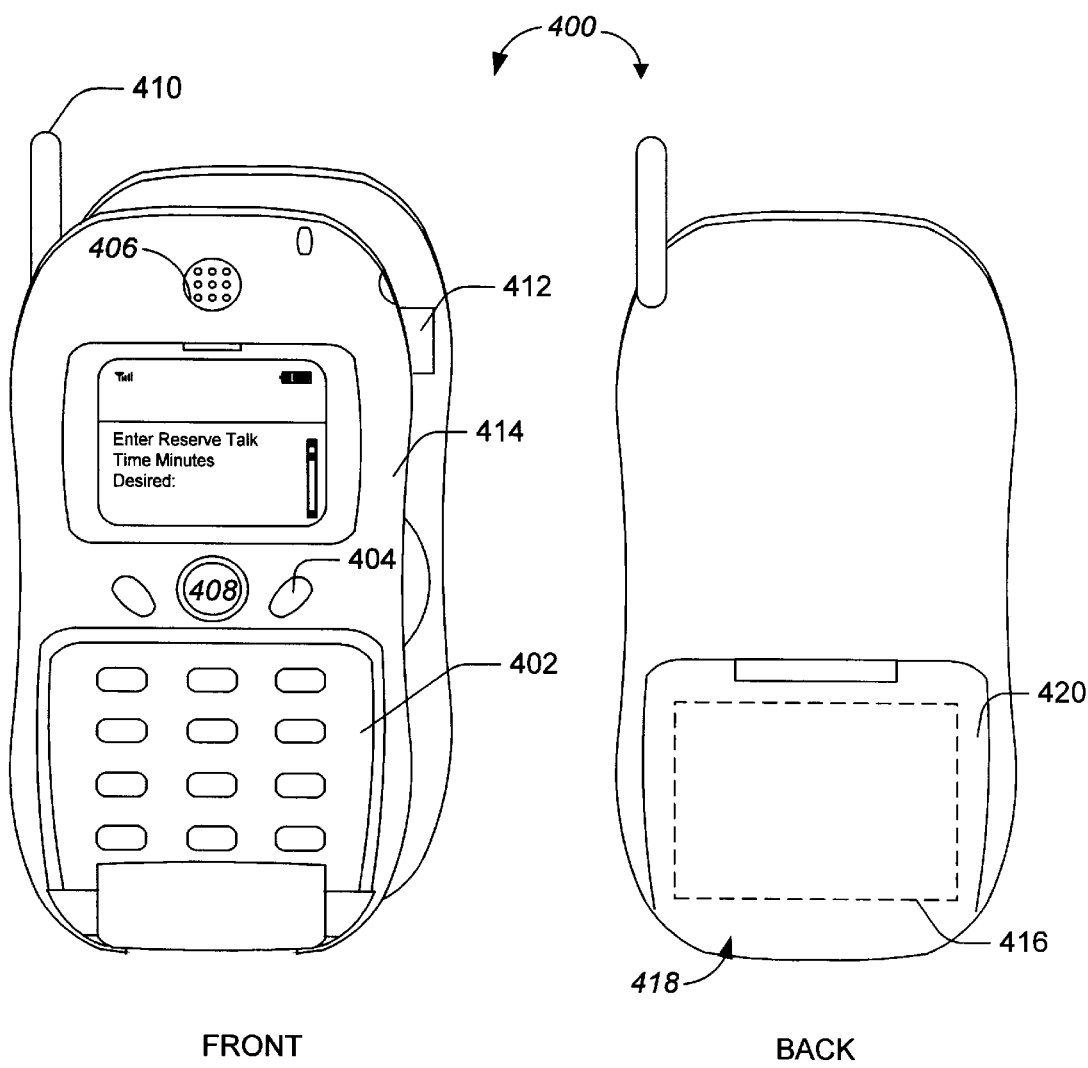
FIGS. 4A and 4B show a front perspective view and a rear view of a cellular telephone system using the reserve power option system.

FIG. 4A shows an exploded front perspective view of a cellular telephone system 400 using the reserve power option system 104. The cellular telephone system 400 also includes a key pad 402 and various other buttons 404 and indicators 406. The telephone system 400 also includes a speaker 406, a microphone 408, an antenna 410, and other communication electronics 412 contained within a telephone housing 414. A display unit 416 is used in conjunction with the keypad 402 to facilitate user inputs, such as reserve talk time minutes desired.

A rear view of the cellular telephone system 400 is shown in FIG. 4B. In one embodiment, the battery pack 416 is placed within a small housing 418. The housing 418 and the battery pack 416 is covered with a cover 420.

Figure 5:
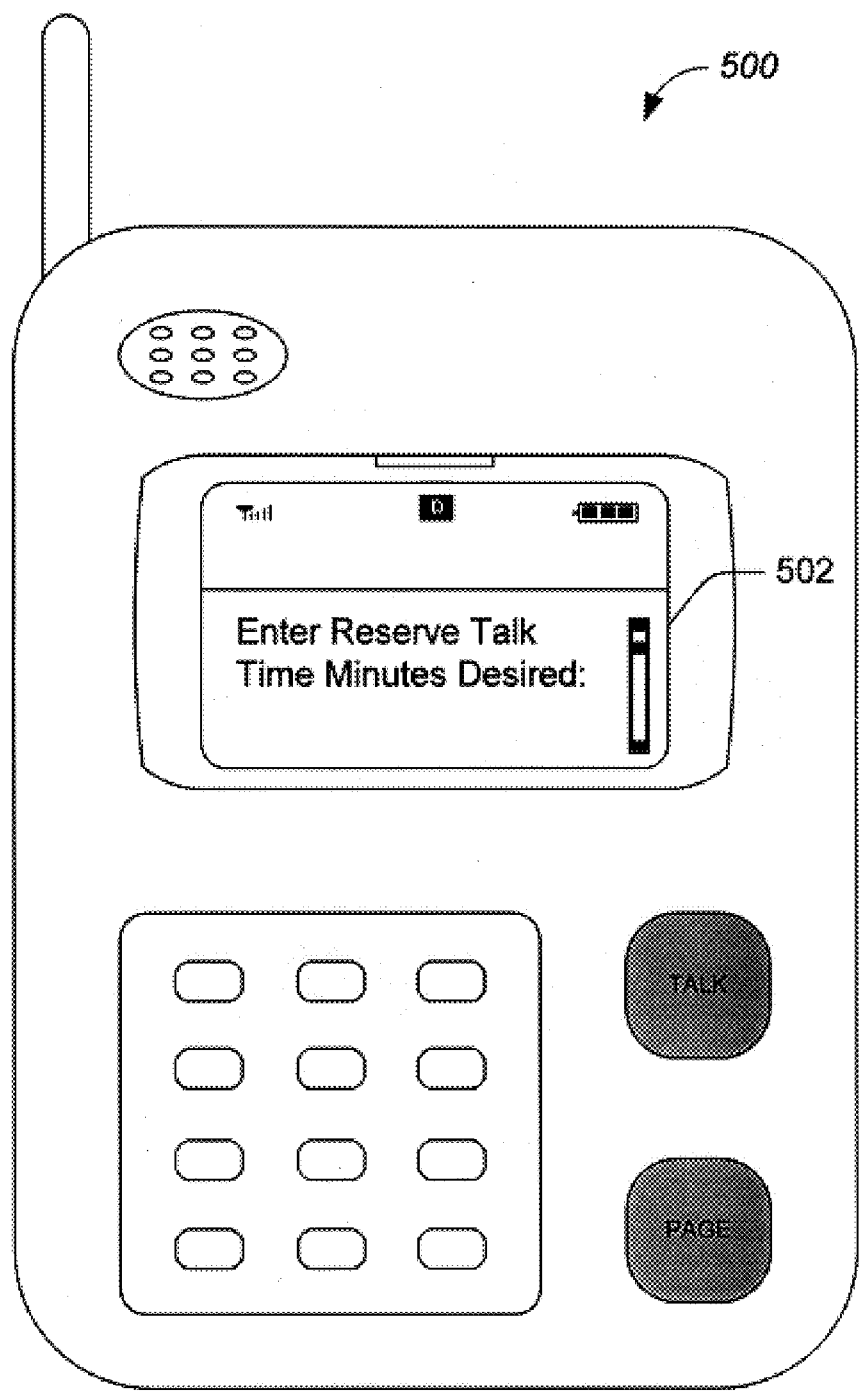
FIG. 5 shows a portable communication device including the reserve power option system.

FIG. 5 shows a portable communication device 500 including the reserve power option system 502. The communication device 500 also includes communication electronics similar to those in the cellular telephone system 400.

Figure 6:
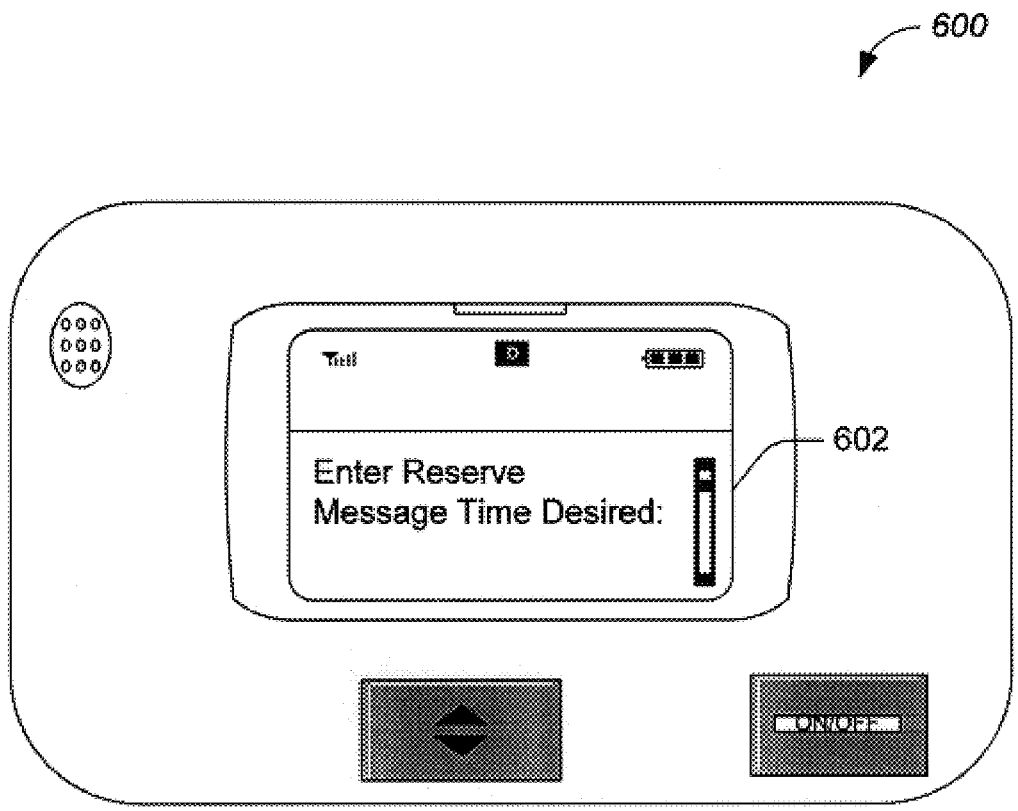
FIG. 6 shows a paging device including the reserve power option system.

FIG. 6 shows a paging device 600 including the reserve power option system 602. The paging device 600 also includes communication electronics similar to those in the cellular telephone system 400.

Although only a few embodiments have been described in detail above, those of ordinary skill in the art certainly understand that modifications are possible. For example, the reserve power option system may automatically provide a preset reserve talk time for emergency or other use when the user does not input a reserve talk time. The user may override the preset talk time later. Also, a power switch, illustrated in FIG. 1, can be implemented by a firmware process using existing mechanisms in the device electronics. All such modifications are intended to be encompassed within the following claims, in which:

What is claimed is:

1. A reserve power option system for a portable electronic device operating from a battery, comprising:
a battery capacity determination element; a processor, adapted to receive power level information indicative of power remaining in said battery from said battery capacity determination element, said processor operating to generate a command that commands the portable electronic device into a power-saving mode when the power remaining in said battery reaches a pre-specified level; and
a battery controller configured to control the battery in response to the command from said processor to transition the portable electronic device into said power-saving mode.

2. The system of claim 1, further comprising a user interface configured to receive an entry of said pre-specified level in terms of reserve talk time minutes, so that said processor may compute said pre-specified level in terms of battery power level from the received reserve talk time minutes.

3. The system of claim 1, further comprising a user interface configured to receive an entry of said pre-specified level in terms of a percentage of total power of said battery, so that said processor may compute said pre-specified level in terms of battery power level from the received percentage of total power.

4. The system of claim 1, further comprising:
a power switch configured to connect or disconnect the battery to the portable electronic device, and responsive to said command to turn the power switch off when the device is transitioned into a power-saving mode.

5. A reserve power option system for a portable phone device, said system comprising:
a battery capacity gauge;
a processor adapted to receive battery charge information from the battery capacity gauge and convert said battery charge information to talk time minutes remaining, said processor also configured to receive a user input indicating a desired number of reserve talk time minutes; and
a battery controller configured to control the battery by transitioning the portable phone device into a low-current mode when the talk time minutes remaining falls below the desired number of reserve talk time minutes entered by the user.

6. The system of claim 5, wherein said processor provides a warning to the user of an impending transition to the low-current mode within a predetermined time before the battery capacity gauge falls below the user specified reserve talk time minutes.

7. A portable electronic device having different operating modes, the device comprising:
a battery pack; a capacity gauge configured to measure power remaining in the battery pack;
a device controller adapted to control the operating modes of the portable electronic device; and
a reserve power option system receiving information about the remaining power in said battery pack from said capacity gauge, said reserve power option system generating a command to said device controller to transition the portable device from one operating mode to another when said capacity gauge falls below a specified power level.

8. The device of claim 7, wherein the portable device is transitioned from a standby mode to a power-saving, low-current mode.

9. A method for determining when a portable electronic device should be transitioned into a power-saving mode to reserve some talk time minutes on the device, said method comprising:
receiving a user input indicating a specified battery level at which the device would be transitioned into the power saving mode;
checking a battery capacity gauge to determine power level of a battery pack;
comparing the power level of the battery pack to the user input; and
indicating that the portable electronic device be placed into the power-saving mode when said power level of the battery pack has fallen below the user input.

10. The method of claim 9, wherein the user input is specified in terms of a power level.

11. The method of claim 9, wherein the user input is specified in terms of talk time minutes on the device, such that the specified talk time minutes are converted to an equivalent power level.

12. The method of claim 9, further comprising:
providing a warning to the portable electronic device when the device is about to enter the power-saving mode.

13. The method of claim 12, wherein the warning is given some time before the portable device enters the power-saving mode.

14. The method of claim 9, further comprising:
providing a mechanism for the user to override a reserve power option.

15. A cellular telephone comprising:
a housing;
at least one battery pack contained within the housing, each battery pack having a capacity gauge;
electronic components within the housing; and a reserve power option system residing on said electronic components.

said reserve power option system including:
  a battery capacity gauge,
  a processor adapted to receive battery charge information from the battery capacity gauge and convert said battery charge information to talk time minutes remaining, said processor also configured to receive a user input indicating a desired number of reserve talk time minutes, and
  a battery controller configured to control the battery by transitioning the cellular telephone into a low-current mode when the talk time minutes remaining falls below the desired number of reserve talk time minutes entered by the user.

16. A portable communication device comprising:

a housing;

at least one battery pack contained within the housing, each battery pack having a capacity gauge;

electronic components within the housing; and a reserve power option system residing on said electronic components.

said reserve power option system including:
  a battery capacity gauge,
  a processor adapted to receive battery charge information from the battery capacity gauge and convert said battery charge information to talk time minutes remaining, said processor also configured to receive a user input indicating a desired number of reserve talk time minutes, and
  a battery controller configured to control the battery by transitioning the portable communication device into a low-current mode when the talk time minutes remaining falls below the desired number of reserve talk time minutes entered by the user.

17. A paging device comprising:

a housing;

at least one battery pack contained within the housing, each battery pack having a capacity gauge;

electronic components within the housing; and a reserve power option system residing on said electronic components, said reserve power option system including:
  a battery capacity gauge,
  a processor adapted to receive battery charge information from the battery capacity gauge and convert said battery charge information to talk time minutes remaining, said processor also configured to receive a user input indicating a desired number of reserve talk time minutes, and
  a battery controller configured to control the battery by transitioning the paging device into a low-current mode when the talk time minutes remaining falls below the desired number of reserve talk time minutes entered by the user.

* * * * *